United States Patent
Utsugi

(10) Patent No.: US 7,950,253 B2
(45) Date of Patent: May 31, 2011

(54) MOLDING DEVICE AND METHOD FOR SETTING UP MOLD

(75) Inventor: Masanori Utsugi, Saitama (JP)

(73) Assignee: FujiFilm Corporation, Tokyo (JP)

( * ) Notice: Subject to any disclaimer, the term of this patent is extended or adjusted under 35 U.S.C. 154(b) by 231 days.

(21) Appl. No.: 11/808,681

(22) Filed: Jun. 12, 2007

(65) Prior Publication Data

US 2008/0003324 A1 Jan. 3, 2008

(30) Foreign Application Priority Data

Jun. 13, 2006 (JP) ................. P2006-163691

(51) Int. Cl.
*C03B 11/00* (2006.01)
*C03B 11/06* (2006.01)
*B29D 11/00* (2006.01)

(52) U.S. Cl. .................. 65/305; 264/1.32; 264/2.7

(58) Field of Classification Search .......... 65/305; 264/1.1–2.7

See application file for complete search history.

(56) References Cited

U.S. PATENT DOCUMENTS

| | | | |
|---|---|---|---|
| 5,104,590 A | 4/1992 | Blake | |
| 5,697,996 A | 12/1997 | Tsuda | |
| 5,788,732 A * | 8/1998 | Nomura et al. | 65/64 |
| 5,822,134 A | 10/1998 | Yamamoto et al. | |
| 6,003,339 A * | 12/1999 | Morikita | 65/275 |
| 6,334,335 B1 * | 1/2002 | Hirota et al. | 65/66 |
| 2003/0214061 A1 | 11/2003 | Hosoe | |
| 2004/0119199 A1 | 6/2004 | Huang et al. | |

FOREIGN PATENT DOCUMENTS

| | | |
|---|---|---|
| CN | 1099145 | 2/1995 |
| JP | 7-215722 A | 8/1995 |
| JP | 9-202625 A | 8/1997 |
| JP | 2000-159528 A | 6/2000 |
| JP | 2003-48726 A | 2/2003 |
| JP | 2004-291607 A | 10/2004 |
| JP | 2005-170751 A | 6/2005 |
| JP | 2005-179141 A | 7/2005 |

* cited by examiner

*Primary Examiner* — Matthew J Daniels
*Assistant Examiner* — Cynthia Szewczyk
(74) *Attorney, Agent, or Firm* — Birch, Stewart, Kolasch & Birch, LLP

(57) ABSTRACT

A molding device includes an upper mold 10 (first mold), a lower mold 20 (second mold) and a body mold 30 that aligns axes of the upper and lower molds 10, 20 with each other by being fitted to an exterior of the upper mold 10 and an exterior of the lower mold 20 with the body mold 30 straddling the upper and lower molds 10, 20. The lower mold 20 is supported by a support member 50. The support member 50 can support the lower mold 20 with the lower member 20 being in a floating state.

4 Claims, 5 Drawing Sheets

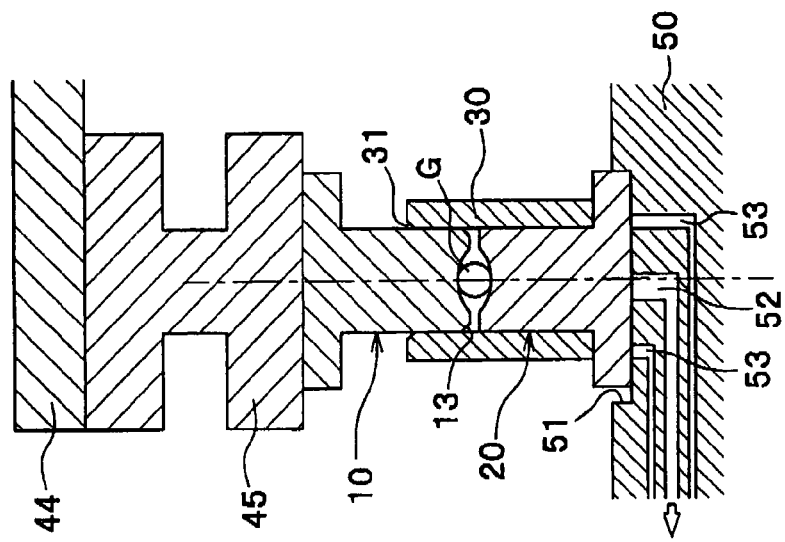
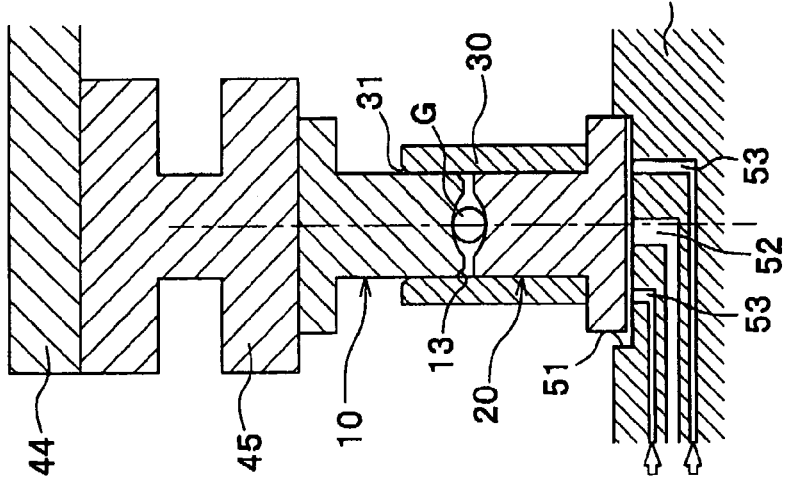
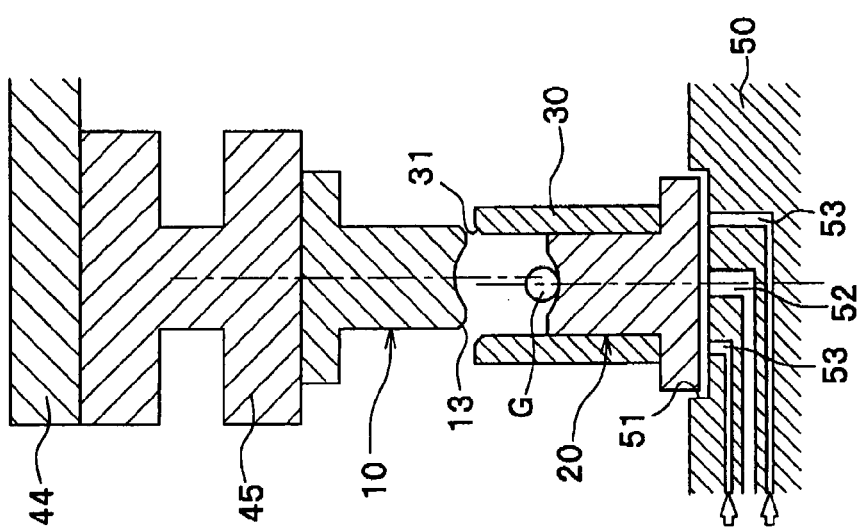

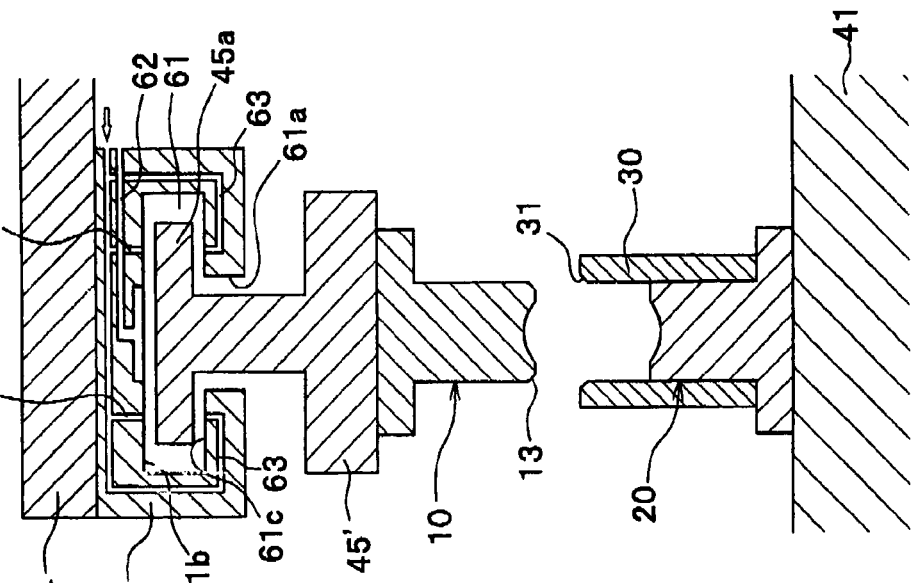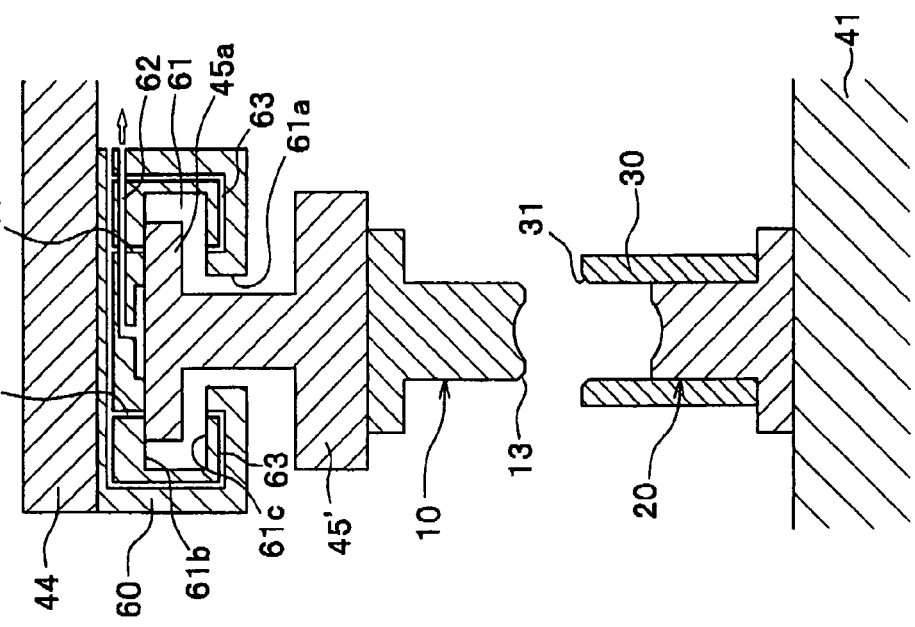

MOLDING DEVICE AND METHOD FOR SETTING UP MOLD

BACKGROUND OF THE INVENTION

1. Technical Field

The invention relates to a molding device for setting up two molds and to a method for setting up the molds using the molding device.

2. Description of the Related Art

There is a molding device 100 shown in FIG. 5 as a molding device for manufacturing an optical component such as a glass lens. The molding device 100 forms a cavity (not shown) by closing an upper mold 110 having a cavity surface 111 in the lower surface thereof and a lower mold 120 having a cavity surface 121 in the upper surface thereof and presses a material in the cavity to manufacture a product such as a lens.

When the upper mold 110 and the lower mold 120 are set up in the mold device 100, a lower part of a cylindrical body mold 130 is first fitted to an exterior of the lower mold 120, which is fixed to a base plate 141 as a base member. Then, the upper mold 110 held by a slider 144 that is movable in an up and down direction is inserted into an upper part of the body mold 130, to thereby align axes of the upper mold 110 and the lower mold 120 with each other (e.g., see JP 2005-170751 A (paragraph 0021 and FIG. 1)).

The upper mold 110 is formed with a taper surface 113 along an outer peripheral edge of a lower surface thereof. The body mold 130 is formed with a taper surface 131 along an inner peripheral edge of an upper opening thereof.

Also, a elastic member 146, such as a rubber material or a spring, is interposed between a chuck member 145 that holds the upper mold 110 and the slider 144. When the elastic member 146 bends, the upper mold 110 is moved in a horizontal direction. In the case where the axes of the upper mold and the lower mold 120 are misaligned upon setting up the upper and lower molds 110, 120, the taper surface 113 of the upper mold 110 abuts against the taper surface 131 of the body mold 130 and the upper mold 110 is moved with following the taper surface 131 of the body mold 130. Thereby, a position of the upper mold 110 is adjusted. As a result, the upper mold 110 and the lower mold 120 are placed in a state where the axes of them are aligned with each other.

However, in the molding device 100, a reaction force acts upon the upper mold 110 due to the bending of the elastic member 146 when the upper mold 110 moves along the body mold 130. This increases a contact pressure between the upper mold 110 and the body mold 130, and the upper mold 110 gnaws the body mold 130. Therefore, the upper mold 110 is worn or damaged.

SUMMARY OF THE INVENTION

To solve the foregoing problem, the invention provides a molding device and a method for setting up molds that can prevent the molds from being worn or damaged when two molds are set up with the axes of the two molds being aligned.

According to an aspect of the invention, in order to solve the foregoing problem, a molding device includes a first mold, a second mold and a body mold. The first and second molds are configured to form a cavity when the first and second molds are closed. A product is molded in the cavity. The body mold aligns axes of the first and second molds with each other by being fitted to an exterior of the first mold and an exterior of the second mold with the body mold straddling the first and second molds. The second mold is supported by a support member. The support member can support the second mold with the second member being in a floating state.

With this configuration, by floating the second mold when the first mold is put onto the second mold with the body mold fitted to the exterior of the second mold, the body and second molds are moved with following the first mold. Thereby, positions of the body and second molds are adjusted relative to the first mold, and the axes of the first and second molds are aligned with each other.

Also, by floating the second mold when the second mold is put onto the first mold with the body mold is fitted to the exterior of the second mold, the second mold is moved with following the body mold and the position of the second mold is adjusted relative to the body mold. Thus, the axes of the first and second molds are aligned with each other.

Because no a reaction force acts on the floated second mold, the contact pressure between the first or second mold and the body mold. Thus, the molds are prevented from being worn or damaged.

In the molding device, the support member may be able to support the second mold with the second mold being in the floating state, and be able to support the second mold with the second mold being in a fixed state.

With this configuration, in the case where the first and second molds are conveyed together with the support member after the first and the second molds are set up with the second mold floated, the first and second molds can be conveyed stably by fixing the second mold to the support member.

In the molding device, the support member may be configured to support the second mold with the second mold being in the floating state by supplying fluid between the second mold and the support member.

Furthermore, in the molding device, the second mold may be supported by the support member through a retention member. The support member may be configured to support the second mold with the second mold being in the floating state by supplying fluid between the second mold and the retention member.

When the second mold is floated by supplying the fluid, the supporting member has a simple configuration. Thus, the manufacturing cost for the molding device can be reduced.

According to another aspect of the invention, a method for setting up molds using any of the above described molding devices includes: floating the second mold from the support member; and aligning the axes of the first and second molds with each other by fitting the body mold to the exteriors of the first and second molds with the body mold straddling the first and second molds.

With this configuration, by floating the second mold when the body mold is fitted to the exteriors of the first and second molds with the body mold straddling the first and second molds, the second mold is moved with following the first and shell molds. In this case, because no reflection force occurs in the floated second mold, the contact pressure between the first or second mold and the body mold is reduced. Thus, the molds are prevented from being worn or damaged.

According to the above configurations, by floating the second mold when the body mold is fitted to the exteriors of the first and second molds with the body mold straddling the first and second molds, no reaction force acts on the second mold. Thus, the contact pressure between the first or second mold and the body mold is reduced. Thus the molds are prevented from being worn or damaged.

BRIEF DESCRIPTION OF THE DRAWINGS

FIG. 2 is a view showing a molding device according to the first embodiment wherein

FIG. 3 is a view showing a manner of setting up molds by means of the molding device of the first embodiment wherein FIG. 3A is a side section view showing a state where a lower mold is floated from the support member, FIG. 3B is a side section view showing a state where an upper mold is inserted in a body mold and FIG. 3C is a side section view showing a state where the upper and lower molds are fixed to the support member.

FIG. 4 is a view showing a molding device according to a second embodiment, wherein FIG. 4A is a side section view showing a state where an upper mold is fixed to a support member and FIG. 4B is a side section view showing a state where the upper mold is floated from the support member.

DETAILED DESCRIPTION OF EMBODIMENTS OF THE INVENTION

Figure 1:
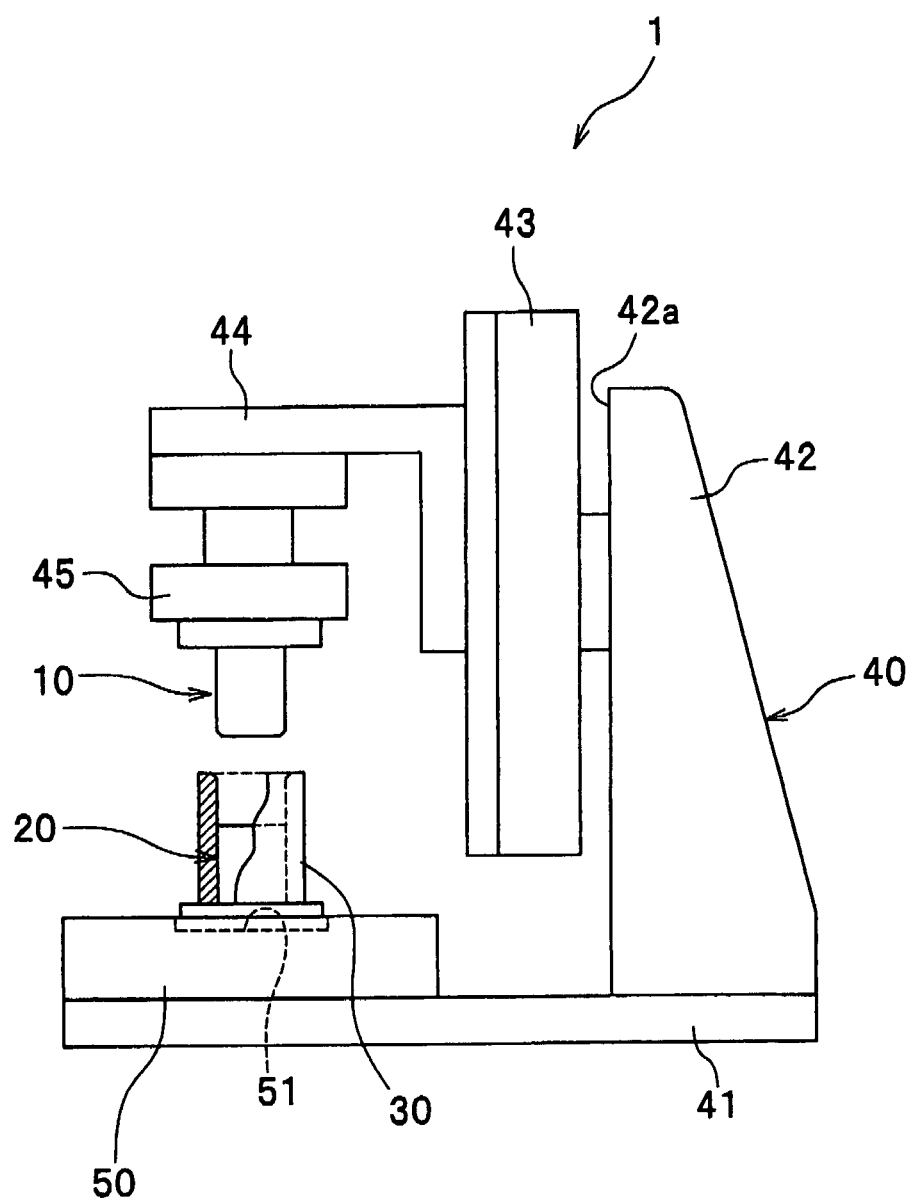
FIG. 1 is a side view showing a molding device according to a first embodiment.

Embodiments of the invention will be described in detail with reference to the accompanying drawings.

In the following embodiments, description will be made on the case where a molding device and a method for setting up molds are applied to a manufacturing process of a glass optical lens (hereinafter, may be referred to as a "lens").

It is noted that in the description on the respective embodiments, like reference numerals are attached to like constituent elements and duplicate explanation will be omitted.

First Embodiment

Figure 2A:
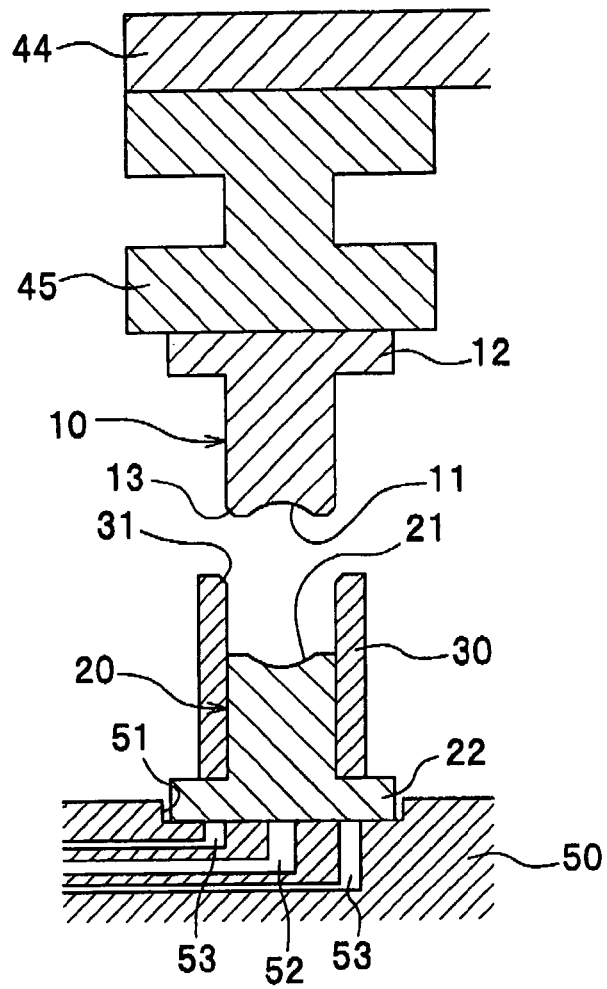
FIG. 2A is a fragmentary enlarged side section view of the molding device and FIG. 2B is a plan view of a support member.
Figure 2B:
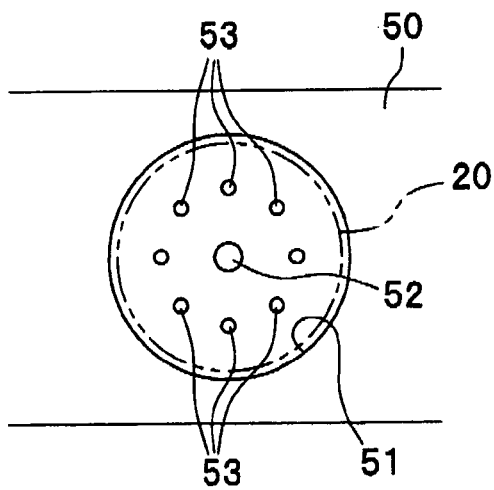
Figure 5:
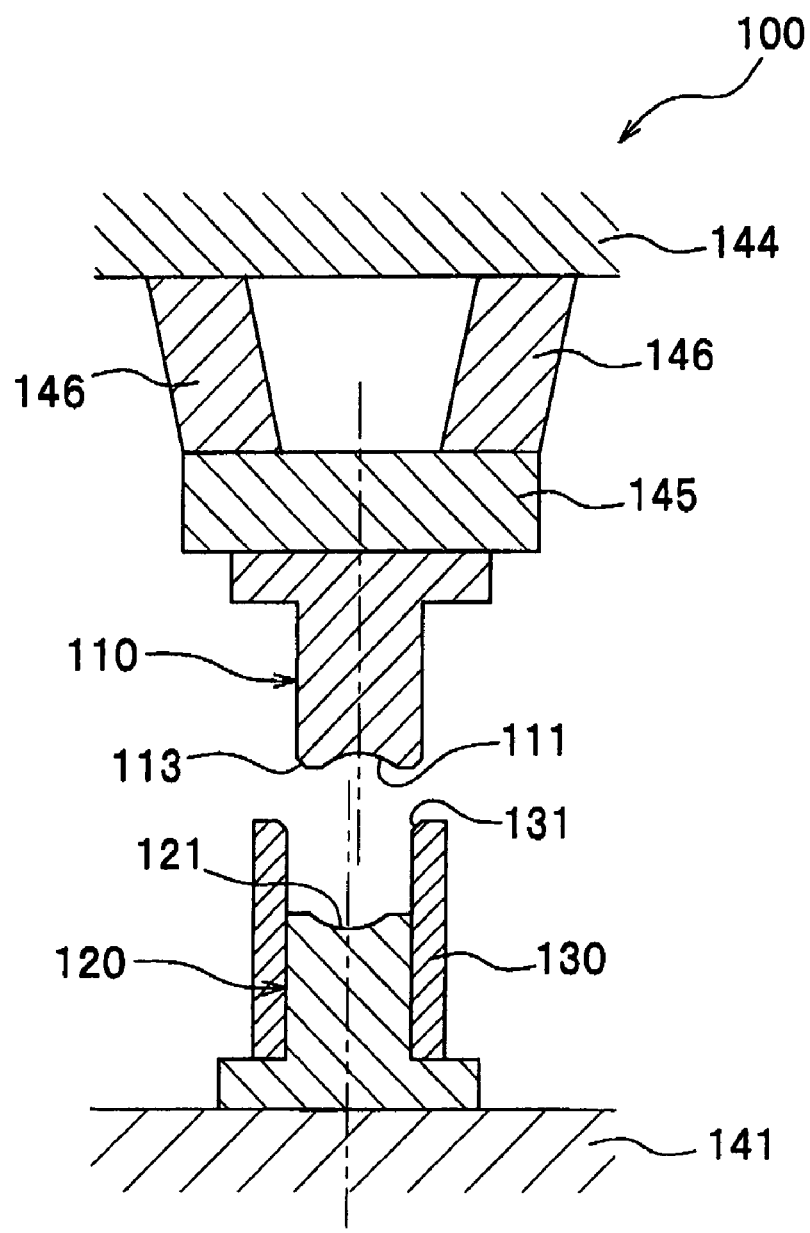
FIG. 5 is a side section view showing a molding device according to a related art.

The configuration of a molding device according to the first embodiment will be described first and then a method for setting up molds using this molding device will be described. FIG. 1 is a side view showing the molding device according to the first embodiment. FIG. 2 is a view showing the molding device of the first embodiment wherein FIG. 2A is a fragmentary enlarged section view of the molding device and FIG. 2B is a plan view of a support member. FIG. 3 is a view showing a manner of setting up molds by means of the molding device of the first embodiment wherein FIG. 3A is a side section view showing a state where a lower mold is floated from the support member, FIG. 3B is a side section view showing a state where an upper mold is inserted in a body mold and FIG. 3C is a side section view showing a state where the upper and lower molds are fixed to the support member.

[Configuration of Molding Device]

As shown in FIG. 1, the molding device 1 includes an upper mold 10 (a non-limiting example of a first mold), a lower mold 20 (a non-limiting example of a second mold), a body mold 30 and a base member 40. The upper and lower molds 10, 20 are configured to form a cavity (not shown) when the first and second molds 10, 20 are closed. The body mold 30 aligns axes of the upper and lower molds 10, 20 with each other by being fitted to exteriors of the first and second molds 10, 20 with the body mold 30 straddling the first and second molds 10, 20. A slider 44 for moving the upper mold 10 and a support member 50 supporting the lower mold 20 are attached to the base member 40.

The molding device 1 is a device for performing steps of putting a material between the upper and lower molds 10, 20 and setting up them. The upper and lower molds 10, 20, set up by the molding device 1 are configured to be conveyed together with the support member 50 to another molding device. In the other molding device, the upper and lower molds 10, 20 are heated and then closed together to press the material in the cavity. Thereby, a lens is molded.

<Configuration of Upper and Lower Molds>

As shown in FIG. 2A, the upper and lower molds 10, 20 are metallic members formed into a cylindrical shape. The upper and lower molds 10, 20 are arranged in a state where they are opposed in the up and down direction.

A cavity surface 11 is formed at the lower end of the upper mold 10. A taper surface 13 is formed along the outer peripheral edge of the lower end surface. Also, the upper mold 10 is formed with a flange 12 along the outer periphery at the upper end thereof.

The upper mold 10 is movable in a mold opening/closing direction (up and down direction) by the slider 44 of the base member 40 (see FIG. 1) which will be described later. Specifically, the upper mold 10 is mounted on the slider 44, which is movable in the up and down direction, through a chuck member 45.

A cavity surface 21 is formed at the upper end of the lower mold 20. A flange 22 is formed along the outer periphery at the lower end of the lower mold 20. The lower mold 20 is mounted on the upper surface of the support member 50 attached to the base member 40 (see FIG. 1).

<Configuration of Support Member>

As shown in FIG. 1, the support member 50 is a rectangular parallelepiped member attached to the upper surface of the base member 40, which will be described later. In the upper surface of the support member 50, a recess 51 is formed in which the lower mold 20 is placed.

The recess 51 is made circular in plan view as shown in FIGS. 2A and 2B. The recess 51 has an outer diameter that is larger than an outer diameter of the flange 22 of the lower mold 20. Specifically, when the lower mold 20 is placed in the recess 51 in a state where a center of the lower mold 20 in plan view is aligned with a center of the recess 51, a gap between the outer peripheral surface of the flange 22 of the lower mold 20 and the inner peripheral surface of the recess 51 is larger than a width of a taper surface 31 formed along the inner peripheral edge of the upper opening of the body mold 30, which is be described later. Also, the recess 51 has a depth that is substantially equal to a half of the height of the flange 22 of the lower mold 20.

Also, a negative-pressure passage 52 is provided inside the support member 50. The negative-pressure passage 52 has one end that opens at the center of the bottom surface of the recess 51 and the other end connected to an air suctioning device (not shown) provided in the outside of the support member 50.

Furthermore, a positive-pressure passage is provided inside the support member 50. The positive-pressure passage has one end that opens in the bottom surface of the recess 51 and the other end connected to an air compressor (not shown) provided in the outside of the support member 50. In this embodiment, eight positive-pressure passages 53 are provided extending along the negative-pressure passage 52. The one ends of the positive-pressure passages 53 open in the bottom surface of the recess 51 and around the negative-pressure passage 52 at an equal intervals.

When the lower mold 20 is put on the bottom surface of the recess 51 and the air compressor connected to the positive-pressure passages 53 is operated, the lower mold 20 is brought into a state where the lower mold 20 floats from the support member 50 by injecting air (fluid) through the opening of the positive-pressure passages 53 to supply the air between the lower mold 20 and the support member 50. It is noted that the air injection pressure is set up in such a degree that the floated lower mold 20 does not move to the outside of the recess 50.

Also, in the case where the air compressor is stopped and the air vacuum device connected to the negative-pressure passage 52 is operated, air (fluid) is suctioned through the opening of the negative-pressure passage 52 and air between the lower mold 20 and the support member 50 is discharged. Thereby, the lower mold 20 is brought in a state where the lower mold 20 is suctioned (fixed) to the support member 50.

In this manner, the support member 50 can support the lower mold 20 in the floating state and can support the lower mold in the fixed state.

<Configuration of Base Member>

As shown in FIG. 1, the base member 40 has a planar base plate 41, a pillar 42 that rises on the upper surface of the base plate 41, a guide rail 43 that extends in the up and down direction and that is attached to a vertical plane 42a formed on the pillar 42, and a slider 44 that is movable in the up and down direction along the guide rail 43. Also, a chuck member 45 is attached to the slider 44. The chuck member 45 has a lower surface that holds the flange 12 of the upper mold 10. It is noted that there is no limitation in the structure with which the chuck member 45 holds the upper mold 10. Namely, known techniques may be applied, e.g. suctioning the upper mold 10 by use of air vacuum, magnetic force or the like, or clamping the upper mold 10 by means of a member such as a claw.

<Configuration of Body Mold>

As shown in FIG. 3, the body mold 30 is a cylindrical member that aligns the axes of the upper and lower molds 10, 20 with each other by being fitted to the exteriors of the upper and lower molds 10, 20 with the cylindrical member straddling the upper and lower molds 10, 20. The body mold 30 is configured such that the upper mold 10 is inserted therein from above and that the lower mold 20 is inserted therein from below. Also, the taper surface 31 is formed in the body mold 30 along the inner peripheral edge of the upper opening of the body mold 30.

<Method for Setting Up Molds Using Molding Device>

Next, the method for setting up the molds using the molding device 1 according to the first embodiment will be described.

At first, as shown in FIG. 2A, the lower mold 20 is put on the bottom surface of the recess 51 of the support member 50, and the body mold 30 is fitted to the exterior of the lower part of the lower mold 20. Also, a material G is put on the cavity surface 21 formed at the upper end of the lower mold 20. On the other hand, the upper mold 10 is attached to the slider 44 through the chuck member 45.

Also, as shown in FIG. 3A, the air compressor (not shown) connected to the positive-pressure passages 53 is operated to inject air through the openings of the positive-pressure passages 53 to thereby supply air between the lower mold 20 and the support member 50 and float the lower mold 20 from the support member 50.

By moving down the slider 44, the upper mold 10 is moved in the mold-closing direction. Then, if the axes of the upper mold 10 and the lower mold 20 are misaligned as shown in FIG. 3A, the taper surface 13 of the upper mold 10 abuts against the taper surface 31 of the body mold 30.

In this case, the lower mold 20 is floated from the support member 50 with the body mold 30 fitted to the exterior of the lower mold 20. Furthermore, a gap formed between the outer peripheral surface of the flange 22 of the lower mold 20 and the inner peripheral surface of the recess 51 is larger than the width of the taper surface 31 of the body mold 30. Therefore, the body mold 30 and the lower mold 20 are moved with following the taper surface 13 of the upper mold 10, and the positions of the body mold 30 and lower mold 20 are adjusted as shown in FIG. 3B. As a result, the upper mold 10 is inserted into the upper part of the body mold 30.

By thus fitting the body mold 30 to the exteriors of the upper and lower molds 10, 20 with straddling the upper and lower molds 10, 20, the axes of the upper mold 10 and the lower mold 20 are aligned with each other. Thus, the upper mold 10 and the lower molds 20 are set up accurately.

Furthermore, as shown in FIG. 3C, after the upper and lower molds 10, 20 are put together, the air compressor is stopped and the air vacuum device (not shown) connected to the negative-pressure passage 52 is operated. Thereby, air is discharged between the lower mold 20 and the support member 50 to suction the lower mold 20 to the support member 50. As a result, when the upper and lower molds 10, 20 are conveyed together with the support member 50, the upper and lower molds 10, 20 can be conveyed stably.

<Operation Effect of Molding Device>

In the molding device 1 shown in FIG. 1, when the upper mold 10 is put onto the lower mold 20 with the body mold 30 fitted to the exterior of the lower mold 20, a reaction force does not act on the lower mold 20 by floating the lower mold 20 from the support member 50 as shown in FIG. 3A. This reduces the contact pressure between the upper mold 10 and the body mold 30, and the upper mold 10 is prevented from being worn or damaged. The lower mold 20 is fixed to the support member 50 after the upper and lower molds 10, 20 are put together as shown in FIG. 3C. Thereby, the upper and lower molds 10, 20 can be conveyed stably together with the support member 50.

Also, air is supplied to between the lower mold 20 and the support member 50, to float the lower mold 20 from the support member as shown in FIG. 3A. Air is discharged from between the lower mold 20 and the support member 50, to fix the lower mold 20 on the support member as shown in FIG. 3C. By thus supplying and discharging air, the lower mold 20 is floated from and fixed on the support member 50. Thus, the support member 50 can be formed with a simple configuration, to thereby reduce the manufacture cost for the molding device 1.

Second Embodiment

Now, a molding device and a method for setting up molds according to a second embodiment will be described.

FIG. 4 shows the molding device according to the second embodiment wherein FIG. 4A is a side section view showing a state where the upper mold is fixed to the support member and FIG. 4B is a side section view showing a state where the upper mold is floated from the support member.

In the molding device according to the second embodiment, the support member 60 attached to the slider 44 is configured to hold the upper mold 10 (a non-limiting example of the "second mold") in a floating state and in a fixed state. Specifically, the upper mold 10 is held by a chuck member 45' (a non-limiting example of a "hold member"), and the upper mold 10 can be supported by the support member 60 through the chuck member 45'.

Also, the lower mold 20 (a non-limiting example of a "first mold") is fixed to the upper surface of the base plate 41 of the base member.

As shown in FIG. 4A, the support member 60 of the second embodiment has a hollow box-like shape defining an interior space 61. A circular through-hole 61a is formed in a lower plate of the support member 60. Through the through-hole 61a, an upper part of the chuck member 45' is disposed in the interior space 61. Also, the chuck member 45' is formed with a disk-like flange 45a at the upper end thereof. The flange 45a has a diameter larger than a diameter of the through-hole 61a.

Also, a negative-pressure passage 62 is formed in the support member 60. The negative-pressure passage 62 has one end that opens in an upper surface 61b of the interior space 60 and the other end connected to an air vacuum device (not shown) provided in the outside of the support member 60.

Furthermore, plural positive-pressure passages 63 are formed in the support member 60. Each of the positive-pressure passages 63 has one end that opens in the upper surface 61b or in the lower surface 61c of the interior space 60 and the other end connected to an air compressor (not shown) provided in the outside of the support member 60.

As shown in FIG. 4B, the support member 60 can support the upper mold 10 with the upper mold 10 being in the floating state, by supplying air between the flange 45a of the chuck member 45' and the upper and lower surfaces 61a, 61b of the interior space 61 through the positive-pressure passages 63 and floating the chuck member 45' in the interior space 61 by means of the supplied air.

Also, as shown in FIG. 4A, the support member 60 can support the upper mold 10 with the upper mold 10 being in the fixed state, by stopping the supply of air through the positive-pressure passages 63 and discharging air between the flange 45a of the chuck member 45' and the upper surface 61b of the interior space 61 through the negative-pressure passage 62 to suction the chuck member 45' to the upper surface 61b of the interior space 61.

It is noted that the support member 60, which can support the upper mold 10 either in the floating state or the fixed state, may be configured by using various known arts without being limited to the above described configuration.

When the upper and lower molds 10, 20 are set up using the molding device of the second embodiment, air is first supplied between the chuck member 45' and the support member 60 within the interior space 61 to float the chuck member 45' from the support member 60 and to bring the upper mold 10 to be in a state where the support member 60 supports the upper mold 10 with the upper mold 10 being in the floating state as shown in FIG. 4B. In this state, the upper mold 10 is moved down and put on the lower mold 20. When the axes of the upper mold 10 and the lower mold 20 are misaligned, the taper surface 13 of the upper mold 10 abuts against the taper surface 31 of the body mold 30. The floating upper mold 10 is moved with following the taper surface 31 of the body mold 30. As a result, the position of the upper mold 10 is adjusted, and the axes of the upper mold 10 and the lower mold 20 are aligned with each other.

In this case, because no reaction force acts on the floating upper mold 10, a contact pressure between the upper mold 10 and the body mold 30 is reduced. This can prevent the upper mold 10 from being worn or damaged.

Other Embodiments

Although the embodiments of the invention are described in detail so far with reference to the drawings, the invention is not limited to the foregoing embodiments but can be modified within the scope without departing from the gist of the invention.

For example, the molding device 1 according to the embodiment (see FIG. 1) is a device for setting up the upper mold 10 and the lower mold 20. The upper and lower molds 10, 20, which are set up by the molding device 1, are configured to be conveyed to a molding device that presses the material. However, the molding device 1 of the embodiment may be configured so as to perform both of setting up the upper and lower molds 10, 20 and molding a lens therein.

Also, the embodiments are configured to support the upper mold 10 or lower mold 20 in the floating and fixed states by supplying and discharging air to and from the support member 50, 60 as shown in FIGS. 3 and 4. However, a configuration for floating and fixing the upper mold 10 or lower mold 20 is not limitative thereto but may use a magnetic force, a liquid or the like. Furthermore, the negative-pressure path 52 may not be provided so long as the upper and lower molds 10, 20 are stable on the support member 50.

Also, in the embodiments, the axes of the upper and lower molds 10, 20 are aligned by use of the cylindrical body mold 30 as shown in FIGS. 2 and 4. However, the configuration for alignment is not limited thereto. For example, the axes of the upper and lower molds 10, 20 may be aligned by splitting the body mold into plural members and bringing the split members to abut against the outer peripheries of the upper and lower molds 10, 20 in at least three directions.

What is claimed is:

1. A molding device comprising:
    an upper mold;
    a lower mold, wherein the upper and lower molds are configured to form a cavity when the upper and lower molds are closed, and a product is molded in the cavity; and
    a body mold that aligns axes of the upper and lower molds with each other by being fitted to an exterior of the upper mold and an exterior of the lower mold with the body mold straddling the upper and lower molds, wherein:
    the upper mold is supported by a support member via a chuck member,
    the support member can support the upper mold with the upper mold being in a floating state by supplying fluid between the chuck member and the support member, and
    a taper surface is formed in at least one of an outer peripheral portion of a tip end of the upper mold, an outer peripheral portion of a tip end of the lower mold and an end portion of an inner surface of the body mold.

2. The molding device according to claim 1, wherein the support member can support the upper mold with the upper mold being in the floating state, and can support the upper mold with the upper mold being in a fixed state.

3. The molding device according to claim 1, wherein the support member is attached to a slider which is configured to hold the upper mold in a floating state and a fixed state.

4. The molding device according to claim 1, wherein the upper mold is held by a chuck member and the upper mold is supported by the support member through the chuck member.

* * * * *